US011343100B2

(12) United States Patent
Narumanchi et al.

(10) Patent No.: US 11,343,100 B2
(45) Date of Patent: May 24, 2022

(54) METHOD AND SYSTEM FOR PRIVACY PRESERVING MULTIFACTOR BIOMETRIC AUTHENTICATION

(71) Applicant: Tata Consultancy Services Limited, Mumbai (IN)

(72) Inventors: Harika Narumanchi, Chennai (IN); Nitesh Emmadi, Hyderabad (IN); Imtiyazuddin Shaik, Hyderabad (IN); Srinivasa Rao Chalamala, Hyderabad (IN); Rajan Mindigal Alasingara Bhattachar, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/184,041

(22) Filed: Feb. 24, 2021

(65) Prior Publication Data

US 2022/0109574 A1 Apr. 7, 2022

(30) Foreign Application Priority Data

Oct. 1, 2020 (IN) .............................. 202021042834

(51) Int. Cl.
*H04L 29/06* (2006.01)
*G06F 21/00* (2013.01)
(Continued)

(52) U.S. Cl.
CPC ............. *H04L 9/3231* (2013.01); *G06N 3/04* (2013.01); *H04L 9/008* (2013.01); *H04L 9/0825* (2013.01); *H04L 9/0869* (2013.01)

(58) Field of Classification Search
CPC ..... H04L 9/3231; H04L 9/008; H04L 9/0825; H04L 9/0869; G06N 3/04
See application file for complete search history.

(56) References Cited

U.S. PATENT DOCUMENTS

2014/0095870 A1* 4/2014 Dewan .................. H04L 9/3231
713/167

FOREIGN PATENT DOCUMENTS

| CN | 102664885 A | 9/2012 |
| CN | 107819587 A | 3/2018 |

(Continued)

OTHER PUBLICATIONS

Habibu, Taban, "Developing an Algorithm for Securing the Biometric Data Template in the Database", International Journal of Advanced Computer Science and Applications, 2019. Semantic Scholar, https://pdfs.semanticscholar.org/4556/3f79ca76d6c3afb44353ecf2f2755d37149.pdf?_qa=2.44495396.169.0727646.1611728679-475540321.1609825006.

(Continued)

*Primary Examiner* — Lisa C Lewis
(74) *Attorney, Agent, or Firm* — Finnegan, Henderson, Farabow, Garrett & Dunner LLP

(57) ABSTRACT

Authentication is a key procedure in information systems. Conventional biometric authentication system is based on a trusted third-party server which is not secure. The present disclosure provides a privacy preserving multifactor biometric authentication for authenticating a client without the third-party authentication server. The server receives a plurality of encrypted biometric features from the client, encrypted using Fully Homomorphic Encryption. Further, the server evaluates the plurality of encrypted biometric features to obtain a client identifier value and a plurality of encrypted resultant values. The server encrypts each of the plurality of resultant values based on a time based nonce and the client identifier value. The encrypted authentication tags and the corresponding resultant values are aggregated by the server and transmitted to the client. The client decrypts the resultant value and the authentication tag and transmits to (Continued)

the server. The server authenticates the client after verifying the received information.

9 Claims, 5 Drawing Sheets

(51) Int. Cl.
*H04L 9/32* (2006.01)
*H04L 9/00* (2022.01)
*G06N 3/04* (2006.01)
*H04L 9/08* (2006.01)

(56) References Cited

FOREIGN PATENT DOCUMENTS

| CN | 107919965 A | 4/2018 |
|---|---|---|
| CN | 111181712 A | 5/2020 |

OTHER PUBLICATIONS

Gomez-Barreroa, Marta et al., "Multi-biometric template protection based on Homomorphic Encryption", Pattern Recognition, Jul. 2017, vol. 67, pp. 149-163, Elsevier, http://atvs.ii.uam.es/atvs/files/2017_PR_multiBtpHE_marta.pdf.

Abidin, Aysajan, "On Privacy-Preserving Biometric Authentication", Lecture Notes in Computer Science, May 2016, Research Gate, https://www.researchgate.net/publication/309034203_On_Privacy-Preserving_Biometric_Authentication/link/581052a808ae009606bb9e06/download.

* cited by examiner

METHOD AND SYSTEM FOR PRIVACY PRESERVING MULTIFACTOR BIOMETRIC AUTHENTICATION

PRIORITY CLAIM

This U.S. patent application claims priority under 35 U.S.C. § 119 to: India Application No. 202021042834, filed on Oct. 1, 2020. The entire contents of the aforementioned application are incorporated herein by reference.

TECHNICAL FIELD

The disclosure herein generally relates to the field of cryptography and, more particular, to a method and system for privacy preserving multifactor biometric authentication.

BACKGROUND

Digital devices are used to perform wide range of activities such as banking and e-commerce shares content on social media and so on in our day to day life. Hence authentication is a key requirement in any information system. The common form of authentication is a password based methods. However, the security and efficiency of passwords is questionable due to several factors like users forgetting the passwords, choosing weak passwords, compromise of passwords and so on. To overcome these problems, alternative authentication method like a multi-factor authentication is essential. For example, bio-metric features like face, iris, fingerprint, etc. can be used to authenticate. Since the bio-metric features are unique and much resistant to loss, the biometric features have received wide attention over other authentication mechanisms.

Conventional methods are based on a trusted third party authentication server. The server stores a biometric template of a user and it is matched against the biometric information provided by the user during authentication process. However, there may be a possibility that the server itself might get compromised due to weak security policies. Hence exposing the bio-metric information of the user to the server is risky and needs to be bypassed. Hence there is a need for authenticating the user without using the trusted third party authentication server, which is challenging.

SUMMARY

Embodiments of the present disclosure present technological improvements as solutions to one or more of the above-mentioned technical problems recognized by the inventors in conventional systems. For example, in one embodiment, a method for privacy preserving multifactor biometric authentication is provided. The method includes receiving, by one or more hardware processors of a server machine, a plurality of encrypted biometric features from a client machine, wherein the plurality of encrypted biometric features are computed by the client machine by: (i) gathering biometric information from a plurality of biometric readers (ii) computing, a plurality of biometric feature vectors corresponding to the biometric information of each of the plurality of biometric readers by a pre-trained Deep Neural Network (DNN) and (iii) encrypting each of the plurality of biometric feature vectors using a Fully Homomorphic Encryption (FHE) key pair comprising a public key and a private key associated with the client machine. The method further includes evaluating, by the one or more hardware processors of the server machine, each of the plurality of encrypted biometric features using a pre-trained Machine Learning (ML) model to obtain a client identifier value associated with the client machine and a plurality of encrypted resultant values corresponding to each of the plurality of encrypted biometric features. The method further includes generating, by the one or more hardware processors of the server machine, a plurality of encrypted authentication tags corresponding to each of the plurality of encrypted resultant values by: (i) generating a time based nonce, wherein the time based nonce is a secure pseudo random number generated based on a seed for a corresponding session and (ii) encrypting each of the plurality of encrypted resultant values based on a plurality of parameters, wherein the plurality of parameters comprises the time based nonce and the client identifier value. The method further includes aggregating, by the one or more hardware processors of the server machine, each of the plurality of encrypted authentication tags by computing a weighted sum of each of the plurality of encrypted authentication tags and the corresponding encrypted resultant value to obtain an aggregated ciphertext. Furthermore, the method includes transmitting, by the one or more hardware processors of the server machine, the aggregated ciphertext to the client machine. Furthermore, the method includes receiving, by the one or more hardware processors of the server machine, the decrypted resultant value and the decrypted authentication tag corresponding to the aggregated ciphertext from the client machine, wherein the client machine decrypts the plurality of aggregated ciphertext based on the FHE private key to obtain the plurality of resultant values and the corresponding decrypted authentication tag, wherein the plurality of resultant values and the corresponding decrypted authentication tag are transmitted by the client machine to the server machine. Furthermore, the method includes computing, by the one or more hardware processors of the server machine, a weighted aggregation value of the plurality of decrypted authentication tags based on a plurality of verification parameters, wherein the plurality of verification parameters comprises the client identifier value, the decrypted resultant value received from the client machine, the time based nonce stored in the server machine and the corresponding decrypted authentication tag. Finally, the method includes authenticating, by the one or more hardware processors of the server machine, by comparing the weighted aggregation value with the corresponding decrypted authentication tag, wherein the client machine is authenticated based on a predetermined verification threshold.

In another aspect, a system for privacy preserving multifactor biometric authentication is provided. The system includes at least one memory storing programmed instructions, one or more Input/Output (I/O) interfaces, and one or more hardware processors of a server machine operatively coupled to the at least one memory, wherein the one or more hardware processors of the server machine are configured by the programmed instructions to receive a plurality of encrypted biometric features from a client machine, wherein the plurality of encrypted biometric features are computed by the client machine by: (i) gathering biometric information from a plurality of biometric readers (ii) computing, a plurality of biometric feature vectors corresponding to the biometric information of each of the plurality of biometric readers by a pre-trained Deep Neural Network (DNN) and (iii) encrypting each of the plurality of biometric feature vectors using a Fully Homomorphic Encryption (FHE) key pair comprising a public key and a private key associated with the client machine. The one or more hardware processors of the server machine are configured by the programmed instructions to evaluate each of the plurality of encrypted biometric features using a pre-trained Machine Learning (ML) model to obtain a client identifier value associated with the client machine and a plurality of encrypted resultant values corresponding to each of the plurality of encrypted biometric features. Further, the one or more hardware processors of the server machine are configured by the programmed instructions to generate a plurality of encrypted authentication tags corresponding to each of the plurality of encrypted resultant values by: (i) generating a time based nonce, wherein the time based nonce is a secure pseudo random number generated based on a seed for a corresponding session and (ii) encrypting each of the plurality of encrypted resultant values based on a plurality of parameters, wherein the plurality of parameters comprises the time based nonce and the client identifier value. Furthermore, the one or more hardware processors of the server machine are configured by the programmed instructions to aggregate each of the plurality of encrypted authentication tags by computing a weighted sum of each of the plurality of encrypted authentication tags and the corresponding encrypted resultant value to obtain an aggregated ciphertext. Furthermore, the one or more hardware processors of the server machine are configured by the programmed instructions to transmit the aggregated ciphertext to the client machine. Furthermore, the one or more hardware processors of the server machine are configured by the programmed instructions to receive the decrypted resultant value and the decrypted authentication tag corresponding to the aggregated ciphertext from the client machine, wherein the client machine decrypts the plurality of aggregated ciphertext based on the FHE private key to obtain the plurality of resultant values and the corresponding decrypted authentication tag, wherein the plurality of resultant values and the corresponding decrypted authentication tag are transmitted by the client machine to the server machine. Furthermore, the one or more hardware processors of the server machine are configured by the programmed instructions to compute a weighted aggregation value of the plurality of decrypted authentication tags based on a plurality of verification parameters, wherein the plurality of verification parameters comprises the client identifier value, the decrypted resultant value received from the client machine, the time based nonce stored in the server machine and the corresponding decrypted authentication tag. Finally, the one or more hardware processors of the server machine are configured by the programmed instructions to authenticate the server machine by comparing the weighted aggregation value with the corresponding decrypted authentication tag, wherein the client machine is authenticated based on a predetermined verification threshold.

In yet another aspect, a computer program product including a non-transitory computer-readable medium having embodied therein a computer program for method and system for privacy preserving multifactor biometric authentication is provided. The computer readable program, when executed on a computing device, causes the computing device to receive a plurality of encrypted biometric features from a client machine, wherein the plurality of encrypted biometric features are computed by the client machine by: (i) gathering biometric information from a plurality of biometric readers (ii) computing, a plurality of biometric feature vectors corresponding to the biometric information of each of the plurality of biometric readers by a pre-trained Deep Neural Network (DNN) and (iii) encrypting each of the plurality of biometric feature vectors using a Fully Homomorphic Encryption (FHE) key pair comprising a public key and a private key associated with the client machine. Further, the computer readable program, when executed on a computing device, causes the computing device to evaluate each of the plurality of encrypted biometric features using a pre-trained Machine Learning (ML) model to obtain a client identifier value associated with the client machine and a plurality of encrypted resultant values corresponding to each of the plurality of encrypted biometric features. Furthermore, the computer readable program, when executed on a computing device, causes the computing device to generate a plurality of encrypted authentication tags corresponding to each of the plurality of encrypted resultant values by: (i) generating a time based nonce, wherein the time based nonce is a secure pseudo random number generated based on a seed for a corresponding session and (ii) encrypting each of the plurality of encrypted resultant values based on a plurality of parameters, wherein the plurality of parameters comprises the time based nonce and the client identifier value. Furthermore, the computer readable program, when executed on a computing device, causes the computing device to aggregate each of the plurality of encrypted authentication tags by computing a weighted sum of each of the plurality of encrypted authentication tags and the corresponding encrypted resultant value to obtain an aggregated ciphertext. Furthermore, the computer readable program, when executed on a computing device, causes the computing device to transmit the aggregated ciphertext to the client machine. Furthermore, the computer readable program, when executed on a computing device, causes the computing device to receive the decrypted resultant value and the decrypted authentication tag corresponding to the aggregated ciphertext from the client machine, wherein the client machine decrypts the plurality of aggregated ciphertext based on the FHE private key to obtain the plurality of resultant values and the corresponding decrypted authentication tag, wherein the plurality of resultant values and the corresponding decrypted authentication tag are transmitted by the client machine to the server machine. Furthermore, the computer readable program, when executed on a computing device, causes the computing device to compute a weighted aggregation value of the plurality of decrypted authentication tags based on a plurality of verification parameters, wherein the plurality of verification parameters comprises the client identifier value, the decrypted resultant value received from the client machine, the time based nonce stored in the server machine and the corresponding decrypted authentication tag. Finally, the computer readable program, when executed on a computing device, causes the computing device to authenticate the server machine by comparing the weighted aggregation value with the corresponding decrypted authentication tag, wherein the client machine is authenticated based on a predetermined verification threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
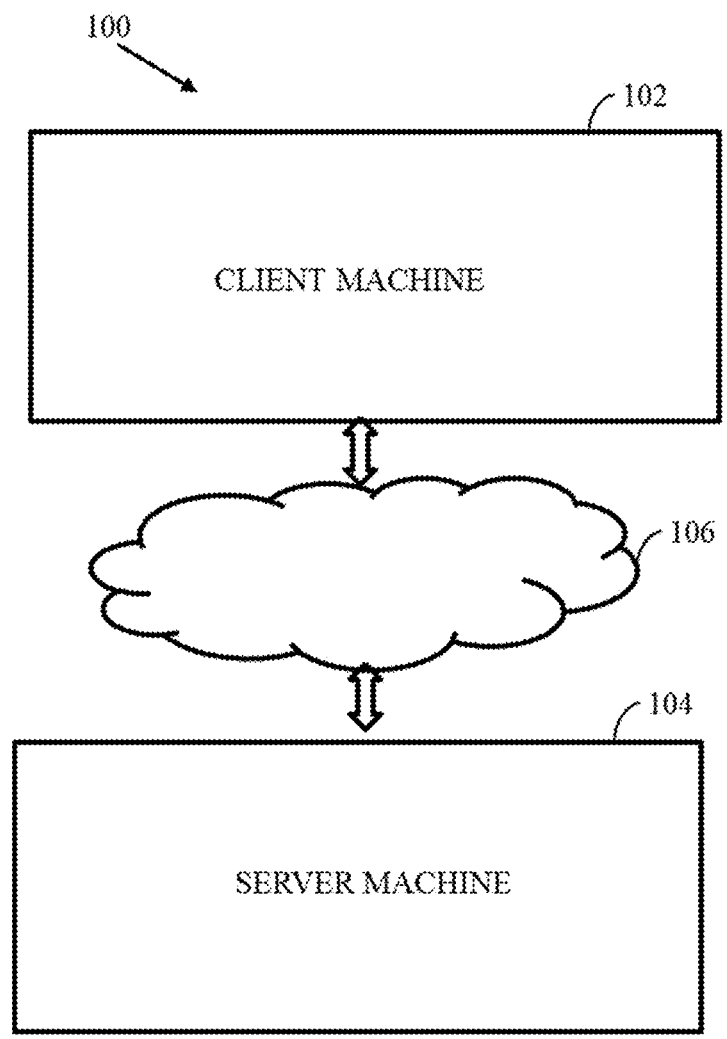
FIG. 1A is a functional block diagram of a system for privacy preserving multifactor biometric authentication, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for privacy preserving multifactor biometric authentication for authenticating a client without a third party authentication server. The system for privacy preserving multifactor biometric authentication includes the client and a server. The server receives a plurality of encrypted biometric features from the client, wherein the plurality of biometric features are encrypted by the client machine based on a Fully Homomorphic Encryption (FHE) key pair comprising a public key and a private key associated with the client. Further, the server evaluates each of the plurality of encrypted biometric features using a pre-trained Machine Learning (ML) model to obtain a client identifier value associated with the client and a plurality of encrypted resultant values corresponding to each of the plurality of encrypted biometric features. Further the server generates a time based nonce and encrypts each of the plurality of resultant values based on the time based nonce and the client identifier value to obtain a plurality of authentication tags. Further, the encrypted plurality of authentication tags and the corresponding resultant values are aggregated by the server and transmitted to the client. The client decrypts the resultant value and the authentication tag using the FHE private key of the client and transmits the decrypted values to the server. The 255 server verifies the values transmitted by the client and authenticates the client based on the outcome of the verification function. The terms 'client' and 'client machine' are used interchangeably throughout the document. Similarly, the terms 'server' and 'server machine' are used interchangeably throughout the document.

Referring now to the drawings, and more particularly to FIGS. 1A through 3, where similar reference characters denote corresponding features consistently throughout the figures, there are shown preferred embodiments and these embodiments are described in the context of the following exemplary system and/or method.

FIG. 1A is a functional block diagram of a system 100 for Privacy preserving multifactor biometric authentication, according to some embodiments of the present disclosure. The system 100 includes a client machine 102, a server machine 104 and a network 106. The client machine 102 and the server machine 104 are connected by the network 106.

In an embodiment, the network 106 can be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

Figure 1B:
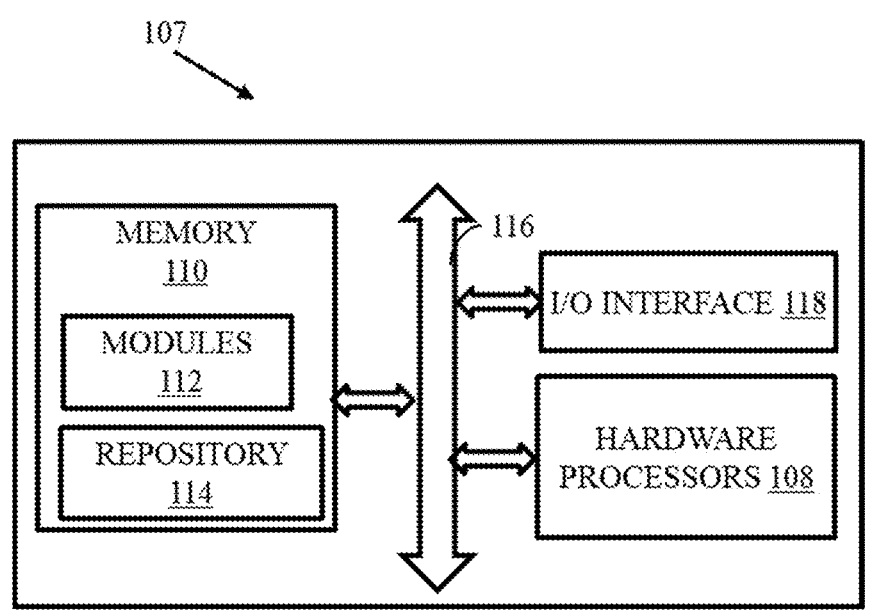
FIG. 1B is a functional block diagram of a computing device associated with the system of FIG. 1A, according to some embodiments of the present disclosure.

In an embodiment, the client machine 102 and the server machine 104 may be implemented in a computing device as shown in FIG. 1B. The client machine 102 can be a hand-held device, a laptop or other portable computer, a tablet computer, a mobile phone, a PDA, a smartphone, and a desktop computer. The client machine 102 and the server machine 104 may also be implemented in a workstation, a mainframe computer, a server, and a network server. The client machine 102 is connected with one or more biometric devices (not shown in FIG. 1A) including a fingerprint device, palmprint device, face recognition device and an iris recognition device through a wired or a wireless network 106.

FIG. 1B is a functional block diagram of a computing device 107 associated with the system of FIG. 1A implementing the server 104, according to some embodiments of the present disclosure. The computing device 107 is otherwise in communication with hardware processors 108, at least one memory such as a memory 110, an I/O interface 118. The hardware processors 108, memory 110, and the Input/Output (I/O) interface 118 may be coupled by a system bus such as a system bus 116 or a similar mechanism. In an embodiment, the hardware processors 108 can be one or more hardware processors.

The I/O interface 118 may include a variety of software and hardware interfaces, for example, a web interface, a graphical user interface, and the like. The I/O interface 118 may include a variety of software and hardware interfaces, for example, interfaces for peripheral device(s), such as a keyboard, a mouse, an external memory, a printer and the like. Further, the interface 118 may enable the server machine 104 to communicate with other devices, such the client machine 102 via the network 106, web servers and external databases and the like.

The I/O interface 118 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 118 may include one or more ports for connecting a number of computing systems with one another or to another server computer. The I/O interface 118 may include one or more ports for connecting a number of devices to one another or to another server.

The one or more hardware processors 108 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 108 is configured to fetch and execute computer-readable instructions stored in the memory 110.

The memory 110 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 110 includes a plurality of modules 112. The memory 110 also includes a data repository 114 for storing data processed, received, and generated by the plurality of modules 112.

The plurality of modules 112 include programs or coded instructions that supplement applications or functions performed by the server machine 104 for privacy preserving multifactor biometric authentication. The plurality of modules 112, amongst other things, can include routines, programs, objects, components, and data structures, which performs particular tasks or implement particular abstract data types. The plurality of modules 112 may also be used as, signal processor(s), state machine(s), logic circuitries, and/or any other device or component that manipulates signals based on operational instructions. Further, the plurality of modules 112 can be used by hardware, by computer-readable instructions executed by the one or more hardware processors 108, or by a combination thereof. The plurality of modules 112 can include various sub-modules (not shown). The plurality of modules 112 may include computer-readable instructions that supplement applications or functions performed by the system 100 for privacy preserving multifactor biometric authentication.

The data repository 114 may include a plurality of abstracted piece of code for refinement and data that is processed, received, or generated as a result of the execution of the plurality of modules in the module(s) 112. The data repository may also include data associated with the machine learning model used in the method for privacy preserving multifactor biometric authentication. For example, training data and testing data associated with the ML models.

Although the data repository 114 is shown internal to the system 100, it will be noted that, in alternate embodiments, the data repository 114 can also be implemented external to the system 100, where the data repository 114 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

As understood by ordinary person skilled in the art, the client machine 102 has functional components similar to functional components of server 104 as depicted by computing device 107 in FIG. 2 and not repeated herein for brevity. The components perform functions in accordance with instructions stored in memory block of the client device enabling the client device to communicate with the server 104.

Figure 2A:
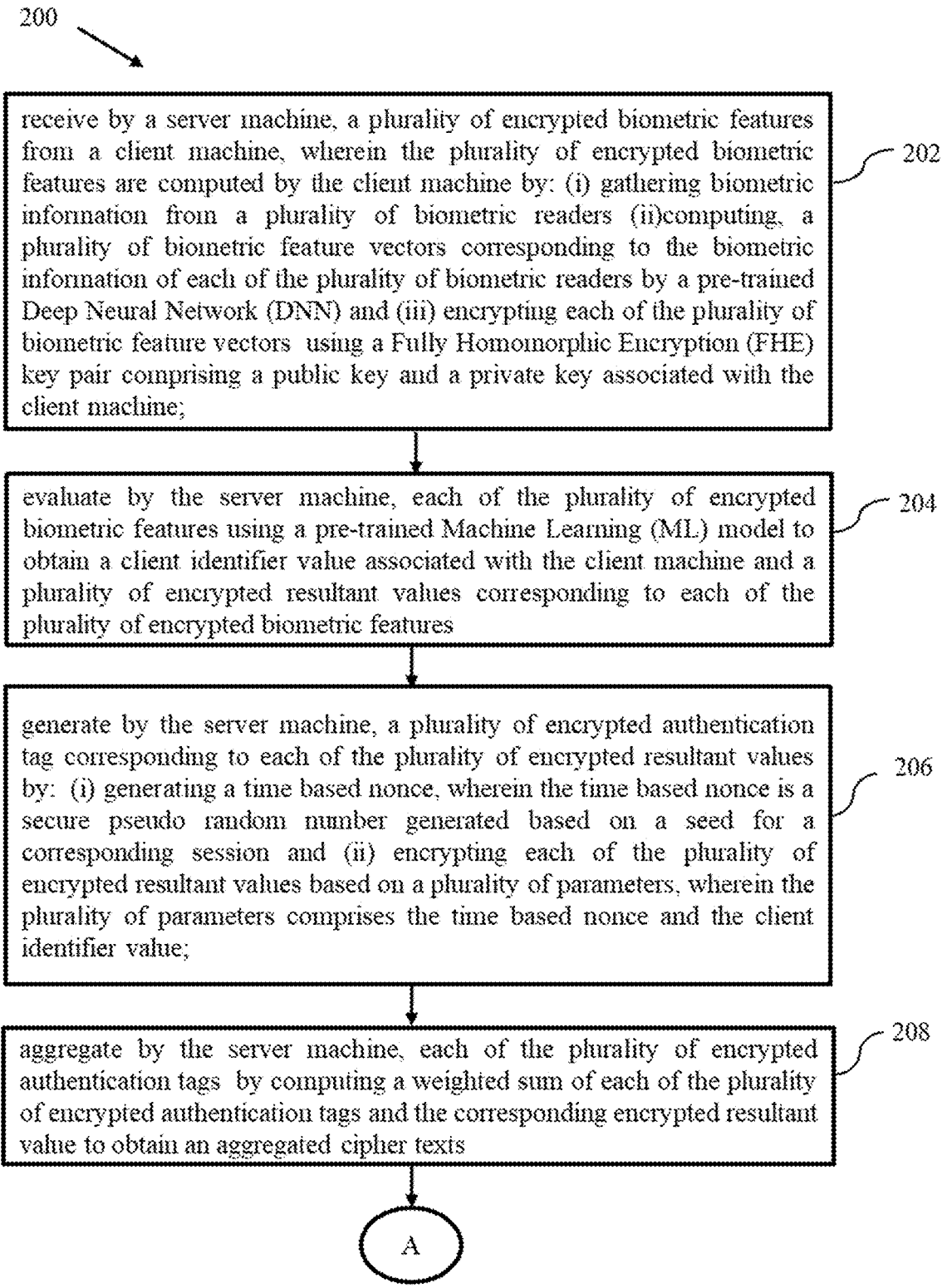
FIGS. 2A and 2B are exemplary flow diagrams for a method for privacy preserving multifactor biometric authentication implemented by the system of FIG. 1A, in accordance with some embodiments of the present disclosure.
Figure 2B:
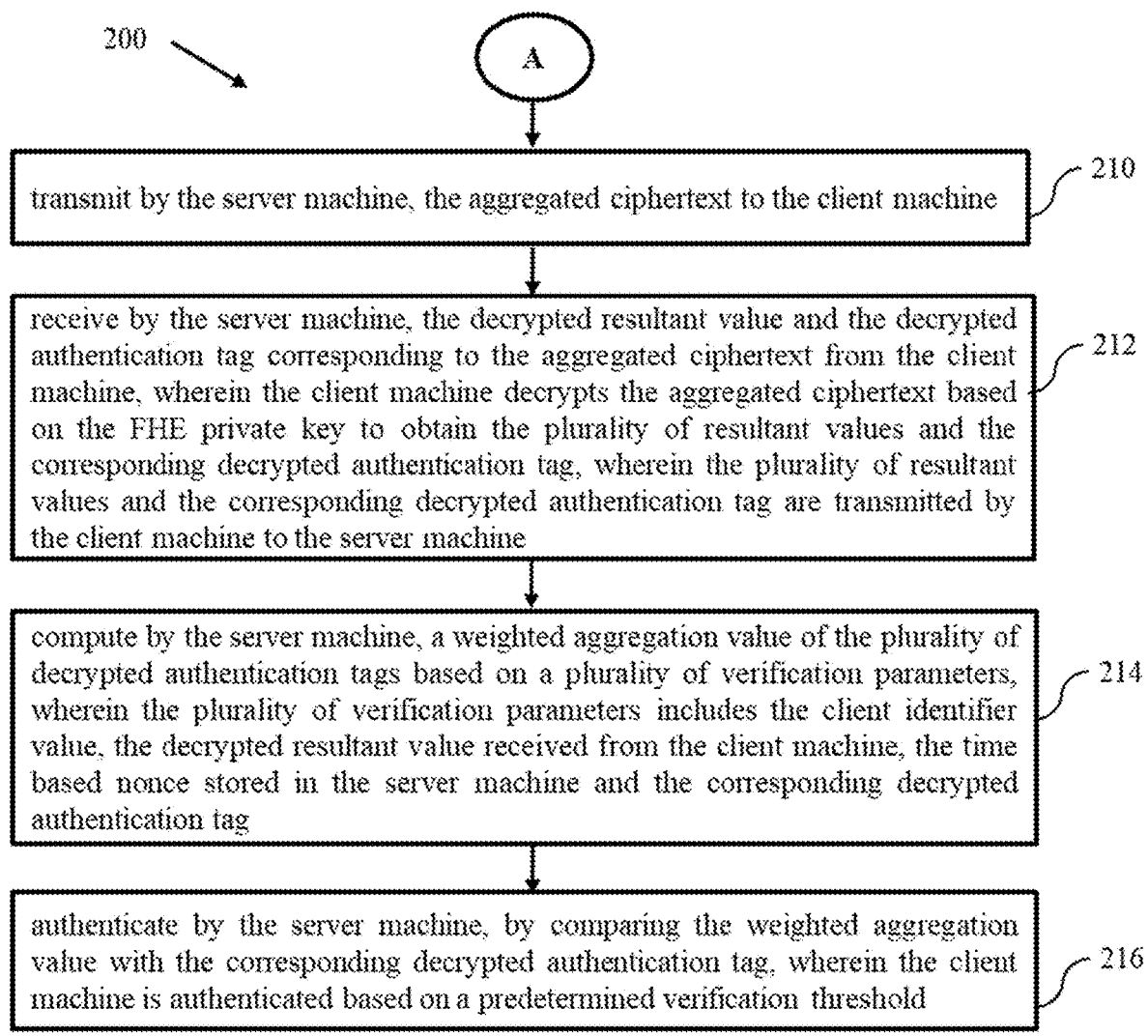

FIGS. 2A and 2B are exemplary flow diagrams for a processor implemented method for Privacy preserving multifactor biometric authentication implemented by the system of FIG. 1A and FIG. 1B according to some embodiments of the present disclosure. In an embodiment, the computing device 107, implementing the server 104, comprises one or more data storage devices or the memory 110 operatively coupled to the one or more hardware processor(s) 108 and is configured to store instructions for execution of steps of the method 200 by the one or more hardware processors 108. The steps of the method 200 of the present disclosure will now be explained with reference to the components or blocks of the system 107 as depicted in FIG. 1B and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 108 of the server machine receive a plurality of encrypted biometric features from the client machine. Here, the client machine gathers the biometric information from a plurality of biometric readers and computes the plurality of biometric feature vectors of the plurality of biometric information corresponding to each of the plurality of biometric readers by a pre-trained Deep Neural Network (DNN). The plurality of biometric information includes a face image, an iris, a fingerprint and a palmprint. Further, the client machine encrypts each of the plurality of biometric feature vectors using the FHE public key associated with the client machine.

For example, the client machine generates a set of FHE keypair $(P_k, S_k)$ where $P_k$ is the public key that is public and can be shared to any party and $S_k$ is the secret key that is only held by the client securely. This keypair can be used for a long-term transaction or for a short-term transaction (for example, per session) depending on the application and required security level. The FHE encryption scheme is like any typical public key encryption scheme with an additional capability to support computation including addition and multiplication on the encrypted data (ciphertexts). Further, Biometric reader extracts n biometrics (face, iris, fingerprint, etc.) on the client side and n number of biometric feature vectors are generated for the corresponding biometric information by the pre-trained DNN. For example, the plurality of biometric feature vectors are represented as, $B_1, B_2, \ldots B_n$. The plurality of bio-metric feature vectors, $B_1, B_2, \ldots B_n$, are encrypted by the client using client's public key $P_k$ to obtain the plurality of encrypted biometric feature vectors, $Enc(B_1, P_k) \ldots Enc(B_n, P_k)$. For brevity of description, the plurality of encrypted biometric feature vectors are represented as $Enc(B_1) \ldots Enc(B_n)$. Further, a batching mechanism is utilized to compress the size of ciphertext (the plurality of encrypted biometric feature vectors) to save communication bandwidth. The plurality of encrypted biometric feature vectors, $Enc(B_1) \ldots Enc(B_n)$ are transmitted to the server for authentication purpose. The communication between the client and the server is through secure channel Transport Layer Security (TLS).

The FHE allows arbitrary computations on encrypted data without decrypting them. Given a set of ciphertexts $\{C_1 \ldots C_n\}$ corresponding to messages $\{m_1 \ldots m_n\}$, the FHE can be utilized to compute a function $F\{C_1 \ldots C_n\}$ resulting in an encrypted output, which when decrypted is equal to the result of computation $F(m_1 \ldots m_a)$. A typical public key encryption algorithm has a KeyGen, an Encrypt and a Decrypt functions that perform generation of public and private key pairs, encrypting a message with public key and decrypt a message with private key respectively. In addition to these functions, the FHE encryption algorithms includes an Eval function that evaluates a given function Foyer a set of input ciphertexts $C=\{C_0 \ldots C_n\}$. Operations supported by FHE encryption schemes depend on the underlying mathematical structure of the ciphertexts.

In an embodiment, applications based on FHE can use either bit-wise encryption instantiation or integer-wise encryption instantiation to encrypt data, however bit-wise encryption increases the size of data sets. The space required to store the ciphertext of an I-bit integer in bit-wise encryption instantiation is I-ciphertext units whereas integer-wise encryption requires only one ciphertext unit. Even though the integer-wise encryption seems more desirable due to less memory than the bit-wise encryption, the bit-wise encryption is more efficient in terms of performance.

In an embodiment, the pre-trained DNN includes an input layer, fully connected hidden layer 1, fully connected hidden layer 2, fully connected hidden layer 3, fully connected hidden layer 4 and a plurality of output layers. A Polynomial approximation of the Rectified Linear Unit activation function is used in fully connected layers 2 and 3. The Polynomial approximation of the sigmoid activation function is used in the fully connected layer 4. No dropout is used in any of these fully connected layers. The pre-trained DNN is trained during enrollment of the biometric information.

At step 204 of the method 200, the one or more hardware processors 108 of the server machine 104, evaluate each of the plurality of encrypted biometric features $Enc(B_1) \ldots Enc(B_n)$ using a pre-trained Machine Learning (ML) model to obtain the client identifier value associated with the client machine and the plurality of encrypted resultant values $Enc(R_1) \ldots Enc(R_n)$ corresponding to each of the plurality of encrypted biometric features. The client identifier value is assigned by the server machine during registration of the client machine with the server machine.

In an embodiment, the pre-trained ML model for evaluating each of the plurality of biometric features can be a logistic regression based ML model. The logistic regression based ML model is trained using biometric data set.

At 206 of the method 200, the one or more hardware processors 108 of the server machine generate, a plurality of encrypted authentication tags $Enc(tag_1) \ldots Enc(tag_n)$ (for example $E(tag_1)=Sign(N, id, Enc(R1),1)))$ corresponding to each of the plurality of encrypted resultant values by: (i) generating a time based nonce, wherein the time based nonce is a secure pseudo random number generated based on a seed for a corresponding session and (ii) encrypting each of the plurality of encrypted resultant values based on a plurality of parameters. The plurality of parameters includes the time based nonce and the client identifier value. The seed is a time stamp. The generated time based nonce is stored in the server.

The plurality of encrypted authentication tags are generated using Homomorphic Message Authentication Code (HMAC). The method of generating the encrypted authentication tag using the HMAC is explained as follows: In an embodiment, to construct the HMAC (q, n, m), a Pseudo Random Generator $G:K_G \to F_q^{n+m}$ and a pseudo random number function $F:K_F \times X(IX[m]) \to F_q$ is used, where 'i' denotes set of identifiers i.e. 'id' is identifier used to identify vector space corresponding to biometric feature vector, q is the order of a set having the random numbers. 'm' is the number of vectors, 'n' is the n dimensional linear space, $F_q$ is the field. Key for MAC consist of pairs $(k_1, k_2)$ where $k_1 \in K_G$ and $k_2 \in K_F$. The pseudo code for constructing the HMAC is given below:

Sign(k, id, v, i): To generate a tag for an $i^{th}$ basis vector $v \in F_q^{n+m}$ using key $k=(k_1, k_2)$ do:
  i. $u \leftarrow G(k_1)$
  ii. $b \leftarrow F(k_2, (id, i)) \in F_q$
  iii. $t \leftarrow ((u \cdot v)+b) \in F_q$ Output tag t. Her, the tag is a single element of $F_q$
Combine$((v_1, t_1, \alpha_1), \ldots (v_m, t_m, \alpha_m))$: output $t \leftarrow \Sigma_{j=1}^m \alpha_j t_j$
$\in F_q$ At 208 of the method 200, the one or more hardware processors 108 of the server machine, aggregate each of the plurality of encrypted authentication tags with the corresponding encrypted resultant value to obtain the aggregated ciphertext. The plurality of aggregated ciphertexts are a weighted sum of each of the plurality of encrypted authentication tags, as given in the above pseudo code and is represented in equation 1. For example, given the following inputs 'n' vectors $Enc(R_1) \ldots Enc(R_n)$ and the corresponding encrypted tags $Enc(tag_1) \ldots Enc(tag_n)$, the system combines under key 'N' and 'n' constants $\{\alpha_1 \ldots \alpha_n\}$ to obtain the plurality of aggregated ciphertexts, represented as $Enc(tag_1).\alpha_1 \ldots, Enc(tag_n).\alpha_n$.

$$\Sigma_{j=1}^m \alpha_j t_j \in F_q \quad (1)$$

where $t_j$ corresponds to encryption of $tag_j$.

At 210 of the method 200, the one or more hardware processors 108 of the server machine transmit the plurality of aggregated ciphertext to the client machine.

At 212 of the method 200, the one or more hardware processors 108 of the server machine receive the decrypted resultant value and the decrypted authentication tag corresponding to the aggregated ciphertext from the client machine. The client machine decrypts the aggregated ciphertext based on the FHE private key to obtain the plurality of resultant values and the corresponding decrypted authentication tag and transmits the plurality of resultant values and the corresponding decrypted authentication tag to the server machine.

At 214 of the method 200, the one or more hardware processors 108 of the server machine compute, a weighted aggregation value of the plurality of decrypted authentication tags based on a plurality of verification parameters, wherein the plurality of verification parameters includes the client identifier value, the decrypted resultant value received from the client machine, the time based nonce stored in the server machine and the corresponding decrypted authentication tag.

At 216 of the method 200, the one or more hardware processors 108 of the server compare the weighted aggregation value with the corresponding decrypted authentication tag, wherein the client machine is authenticated based on a predetermined verification threshold. For example, out of "n" biometrics, if 'k' are valid, then server can authenticate the client positively. If the result of the verification function is 1, the client is authenticated by the server.

In an embodiment, the method of verification by the server is explained in the following pseudo code:

Verify(k, id, y, t): let k=(k$_1$, k$_2$) be a secret key and let y=(y$_1$ ... y$_{n+m}$) $\in F_q^{n+m}$, Do the following:

i. u←G(k$_1$) $\in F_q^{n+m}$ and a←(u. y) $\in F_q$ ii. b←$\Sigma_{j=1}^m$[y$_{n+j}$.F(k$_2$, (id, j))] $\in F_q$ iii. if a+b=t output 1; otherwise output 0

Figure 3:
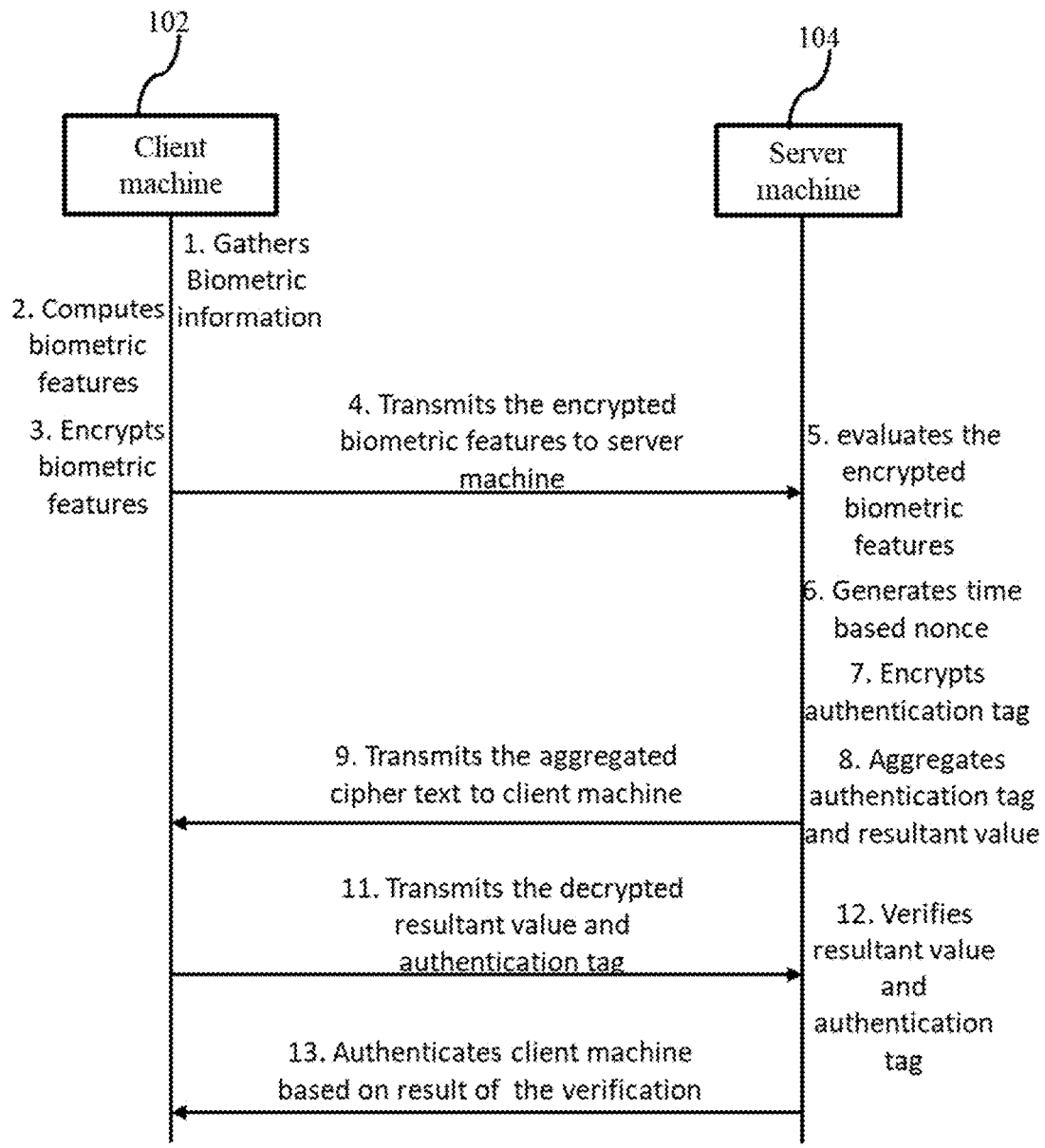
FIG. 3 illustrates a swim lane diagram illustrating the method for privacy preserving multifactor biometric authentication, in accordance with some embodiments of the present disclosure.

FIG. 3 illustrates a swim lane diagram illustrating the method for privacy preserving multifactor biometric authentication, in accordance with some embodiments of the present disclosure.

Now referring to FIG. 3, at step 1, the client machine 102 gathers biometric information from one or more biometric devices including a fingerprint device, palmprint device, face recognition device and an iris recognition device. At step 2, the client machine 102 computes the plurality of biometric features associated with one or more biometric information. At step 3, the client machine 102 encrypts the plurality of biometric features using the FHE. At step 4, the client machine 102 transmits the encrypted plurality of features to the server machine 104. At step 5, the server machine 104 evaluates the encrypted plurality of features using the pre-trained ML model to obtain the client identifier value associated with the client machine 102 and the plurality of encrypted resultant values corresponding to each of the plurality of encrypted biometric features. At step 6, the server machine 104 generates the time based nonce. The time based nonce is the secure pseudo random number generated based on the seed for a corresponding session. At step 7, the server machine 104 encrypts each of the plurality of encrypted resultant values based on the plurality of parameters to obtain the plurality of encrypted authentication tags. The plurality of parameters includes the time based nonce and the client identifier value. At step 8, the server machine 104 aggregates each of the plurality of encrypted authentication tags with the corresponding encrypted resultant value to obtain the aggregated ciphertext. At step 9, the server machine 104 transmits the plurality of aggregated ciphertext to the client machine 102. At step 10, the client machine 102 decrypts the aggregated ciphertext to obtain the resultant value and the authentication tag using FHE key pair. At step 11, the client machine 102 transmits the resultant value and the authentication tag to the server machine 104. At step 12, the server machine computes a weighted aggregation value based on the client identifier value, the decrypted resultant value, the time based nonce and the decrypted authentication tag. At step 13, the server machine 104 authenticates the client machine 102 by comparing the weighted aggregation value with the corresponding decrypted authentication tag, wherein the client machine is authenticated based on the predefined verification threshold.

The one or more processors of the server machine 104 are configured to receive the plurality of encrypted biometric features from the client machine 102. The plurality of encrypted biometric features are computed by the client machine by: (i) gathering the biometric information from the plurality of biometric readers (ii) computing, the plurality of biometric feature vectors of the plurality of biometric information corresponding to each of the plurality of biometric readers by the pre-trained Deep Neural Network (DNN) and (iii) encrypting each of the plurality of biometric feature vectors using the FHE key pair including the public key and the private key associated with the client machine.

Further, the one or more processors of the server machine 104 are configured to evaluate each of the plurality of encrypted biometric features using the pre-trained Machine Learning (ML) model to obtain the client identifier value associated with the client machine and the plurality of encrypted resultant values corresponding to each of the plurality of encrypted biometric features.

Further, the one or more processors of the server machine 104 are configured to generate the plurality of encrypted authentication tags corresponding to each of the plurality of encrypted resultant values by: (i) generating the time based nonce, wherein the time based nonce is the secure pseudo random number generated based on the seed for the corresponding session and (ii) encrypting each of the plurality of encrypted resultant values based on the plurality of parameters, wherein the plurality of parameters includes the time based nonce and the client identifier value.

Further, the one or more processors of the server machine 104 are configured to aggregate each of the plurality of encrypted authentication tags with the corresponding encrypted resultant value to obtain the aggregated ciphertext.

Further, the one or more processors of the server machine 104 are configured to transmit the aggregated ciphertext to the client machine.

Further, the one or more processors of the server machine 104 are configured to receive the decrypted resultant value and the decrypted authentication tag corresponding to each of the plurality of aggregated ciphertext from the client machine. The client machine decrypts each of the plurality of aggregated ciphertext based on the FHE private key to obtain the plurality of resultant values and the corresponding decrypted authentication tag and transmits to the server machine.

Further, the one or more processors of the server machine 104 are configured to compute, the weighted aggregation value of the plurality of decrypted authentication tags based on the plurality of verification parameters, wherein the plurality of verification parameters includes the client identifier value, the decrypted resultant value received from the client machine, the time based nonce stored in the server machine and the corresponding decrypted authentication tag.

Further, the one or more processors of the server machine 104 are configured to authenticate the client machine, by comparing the weighted aggregation value with the corresponding decrypted authentication tag, wherein the client machine is authenticated based on a predetermined verification threshold. For example, out of "n" biometrics, "'k" are valid, then server can authenticate the client positively. If the result of the verification is 1, the client is authenticated by the server.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of providing a privacy preserving multifactor biometric authentication. Here, the client machine is authenticated by the server machine without depending on a third party authentication server. Further, the system utilizes the plurality of biometric features which increases the robustness of authentication. Further, the server machine encrypts an authentication tag based on the time based nonce associated with a particular session which increases security.

It is to be understood that the scope of the protection is extended to such a program and in addition to a computer-readable means having a message therein such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor implemented method, the method comprising:
   receiving, by one or more hardware processors of a server machine, a plurality of encrypted biometric features from a client machine, wherein the plurality of encrypted biometric features are computed by the client machine by:
   gathering biometric information from a plurality of biometric readers;
   computing, a plurality of biometric feature vectors corresponding to the biometric information of each of the plurality of biometric readers by a pre-trained Deep Neural Network (DNN); and
   encrypting each of the plurality of biometric feature vectors using a Fully Homomorphic Encryption (FHE) key pair comprising a public key and a private key associated with the client machine;
   evaluating, by the one or more hardware processors of the server machine, each of the plurality of encrypted biometric features using a pre-trained Machine Learning (ML) model to obtain a client identifier value associated with the client machine and a plurality of encrypted resultant values corresponding to each of the plurality of encrypted biometric features;
   generating, by the one or more hardware processors of the server machine, a plurality of encrypted authentication tags corresponding to each of the plurality of encrypted resultant values by:
   generating a time based nonce, wherein the time based nonce is a secure pseudo random number generated based on a seed for a corresponding session; and
   encrypting each of the plurality of encrypted resultant values based on a plurality of parameters, wherein the plurality of parameters comprises the time based nonce and the client identifier value;
   aggregating, by the one or more hardware processors of the server machine, each of the plurality of encrypted authentication tags by computing a weighted sum of each of the plurality of encrypted authentication tags and the corresponding encrypted resultant value to obtain an aggregated ciphertext;
   transmitting, by the one or more hardware processors of the server machine, the aggregated ciphertext to the client machine;
   receiving, by the one or more hardware processors of the server machine, the decrypted resultant value and the decrypted authentication tag corresponding to the aggregated ciphertext from the client machine, wherein the client machine decrypts the plurality of aggregated ciphertext based on the FHE private key to obtain the plurality of resultant values and the corresponding decrypted authentication tag, wherein the plurality of resultant values and the corresponding decrypted authentication tag are transmitted by the client machine to the server machine;

computing, by the one or more hardware processors of the server machine, a weighted aggregation value of the plurality of decrypted authentication tags based on a plurality of verification parameters, wherein the plurality of verification parameters comprises the client identifier value, the decrypted resultant value received from the client machine, the time based nonce stored in the server machine and the corresponding decrypted authentication tag; and authenticating, by the one or more hardware processors of the server machine, by comparing the weighted aggregation value with the corresponding decrypted authentication tag, wherein the client machine is authenticated based on a predetermined verification threshold.

2. The processor implemented method of claim 1, wherein the biometric information comprises a face image, an iris, a fingerprint and a palmprint.

3. The processor implemented method of claim 1, wherein the client identifier value is assigned by the server machine during registration of the client machine with the server machine.

4. The processor implemented method of claim 1, wherein the seed is a time stamp, wherein the time based nonce is stored in the server.

5. A system comprising:
a client machine and a server machine, wherein the server machine comprises at least one memory storing programmed instructions; one or more Input/Output (I/O) interfaces; and one or more hardware processors of the server machine operatively coupled to the at least one memory, wherein the one or more hardware processors of the server machine are configured by the programmed instructions to:
receive a plurality of encrypted biometric features from a client machine, wherein the plurality of encrypted biometric features are computed by the client machine by:
gathering biometric information from a plurality of biometric readers;
computing, a plurality of biometric feature vectors corresponding to the biometric information of each of the plurality of biometric readers by a pre-trained Deep Neural Network (DNN); and
encrypting each of the plurality of biometric feature vectors using a Fully Homomorphic Encryption (FHE) key pair comprising a public key and a private key associated with the client machine;
evaluate each of the plurality of encrypted biometric features using a pre-trained Machine Learning (ML) model to obtain a client identifier value associated with the client machine and a plurality of encrypted resultant values corresponding to each of the plurality of encrypted biometric features;
generate a plurality of encrypted authentication tags corresponding to each of the plurality of encrypted resultant values by:
generating a time based nonce, wherein the time based nonce is a secure pseudo random number generated based on a seed for a corresponding session; and
encrypting each of the plurality of encrypted resultant values based on a plurality of parameters, wherein the plurality of parameters comprises the time based nonce and the client identifier value;
aggregate each of the plurality of encrypted authentication tags by computing a weighted sum of each of the plurality of encrypted authentication tags and the corresponding encrypted resultant value to obtain an aggregated ciphertext;

transmit the aggregated ciphertext to the client machine;

receive the decrypted resultant value and the decrypted authentication tag corresponding to the aggregated ciphertext from the client machine, wherein the client machine decrypts the plurality of aggregated ciphertext based on the FHE private key to obtain the plurality of resultant values and the corresponding decrypted authentication tag, wherein the plurality of resultant values and the corresponding decrypted authentication tag are transmitted by the client machine to the server machine;

compute a weighted aggregation value of the plurality of decrypted authentication tags based on a plurality of verification parameters, wherein the plurality of verification parameters comprises the client identifier value, the decrypted resultant value received from the client machine, the time based nonce stored in the server machine and the corresponding decrypted authentication tag; and authenticate by comparing the weighted aggregation value with the corresponding decrypted authentication tag, wherein the client machine is authenticated based on a predetermined verification threshold.

6. The system of claim 5, wherein the biometric information comprises a face image, an iris, a fingerprint and a palm print.

7. The system of claim 5, wherein the client identifier value is assigned by the server machine during registration of the client machine with the server machine.

8. The system of claim 5, wherein the seed is a time stamp, wherein the time based nonce is stored in the server.

9. One or more non-transitory machine readable information storage mediums comprising one or more instructions which when executed by one or more hardware processors causes:
receiving a plurality of encrypted biometric features from a client machine, wherein the plurality of encrypted biometric features are computed by the client machine by:
gathering biometric information from a plurality of biometric readers;
computing, a plurality of biometric feature vectors corresponding to the biometric information of each of the plurality of biometric readers by a pre-trained Deep Neural Network (DNN); and
encrypting each of the plurality of biometric feature vectors using a Fully Homomorphic Encryption (FHE) key pair comprising a public key and a private key associated with the client machine;
evaluating each of the plurality of encrypted biometric features using a pre-trained Machine Learning (ML) model to obtain a client identifier value associated with the client machine and a plurality of encrypted resultant values corresponding to each of the plurality of encrypted biometric features;
generating a plurality of encrypted authentication tags corresponding to each of the plurality of encrypted resultant values by:
generating a time based nonce, wherein the time based nonce is a secure pseudo random number generated based on a seed for a corresponding session; and
encrypting each of the plurality of encrypted resultant values based on a plurality of parameters, wherein the plurality of parameters comprises the time based nonce and the client identifier value;

aggregating each of the plurality of encrypted authentication tags by computing a weighted sum of each of the plurality of encrypted authentication tags and the corresponding encrypted resultant value to obtain an aggregated ciphertext;

transmit the aggregated ciphertext to the client machine;

receive the decrypted resultant value and the decrypted authentication tag corresponding to the aggregated ciphertext from the client machine, wherein the client machine decrypts the plurality of aggregated ciphertext based on the FHE private key to obtain the plurality of resultant values and the corresponding decrypted authentication tag, wherein the plurality of resultant values and the corresponding decrypted authentication tag are transmitted by the client machine to the server machine;

compute a weighted aggregation value of the plurality of decrypted authentication tags based on a plurality of verification parameters, wherein the plurality of verification parameters comprises the client identifier value, the decrypted resultant value received from the client machine, the time based nonce stored in the server machine and the corresponding decrypted authentication tag; and authenticate by comparing the weighted aggregation value with the corresponding decrypted authentication tag, wherein the client machine is authenticated based on a predetermined verification threshold.

\* \* \* \* \*